No. 893,704. PATENTED JULY 21, 1908.
J. A. BYRNE.
PLANT PROTECTOR.
APPLICATION FILED MAY 13, 1908.
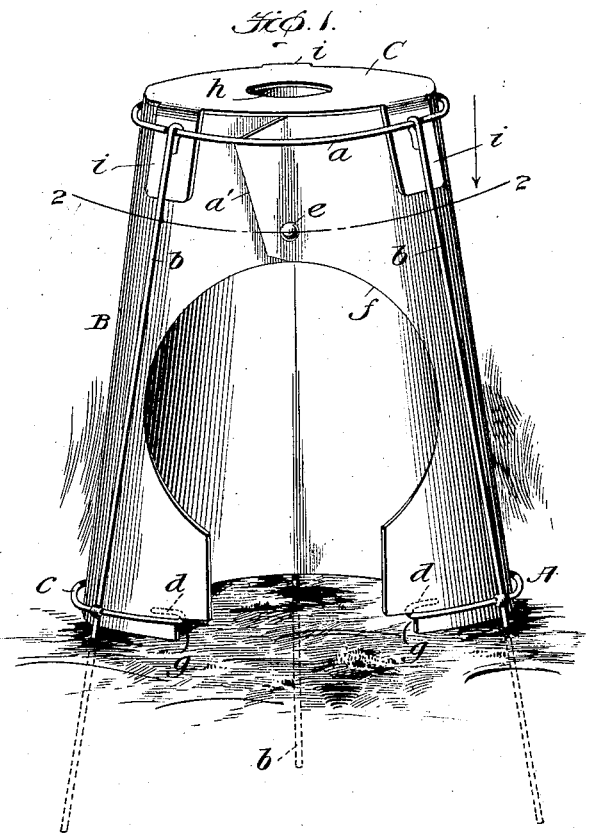
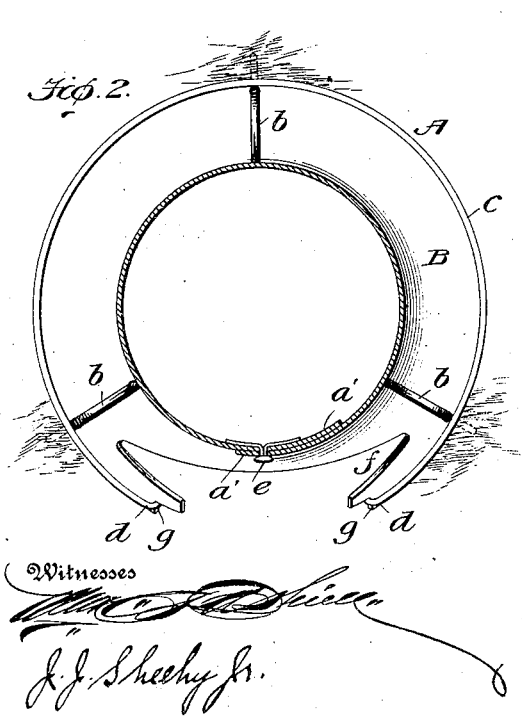
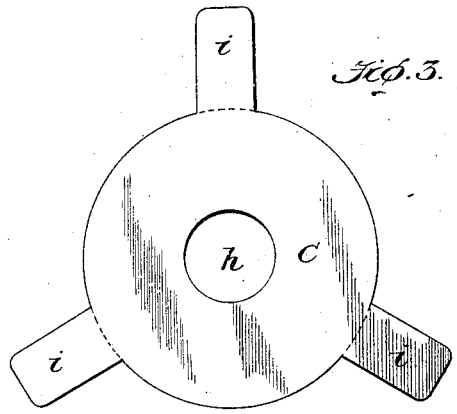
Inventor
John A. Byrne
James Sheehy
Attorney
Witnesses
J. J. Sheehy Jr.

UNITED STATES PATENT OFFICE.

JOHN A. BYRNE, OF RED SPRINGS, NORTH CAROLINA.

PLANT-PROTECTOR.

No. 893,704.  Specification of Letters Patent.  Patented July 21, 1908.

Application filed May 13, 1908. Serial No. 432,678.

*To all whom it may concern:*

Be it known that I, JOHN A. BYRNE, a citizen of the United States, residing at Red Springs, in the county of Robeson and State of North Carolina, have invented new and useful Improvements in Plant-Protectors, of which the following is a specification.

My invention pertains to devices for protecting plants against frost and the weather; and it has for its object to provide an exceedingly cheap plant protector, and one which may be expeditiously and easily secured in proper position relative to a plant when there is danger of frost, and which may be as readily removed when the weather moderates and it is desired to expose the whole plant to the sun.

The invention will be fully understood from the following description and claims when the same are read in connection with the drawings, accompanying and forming part of this specification, in which:

Figure 1 is a perspective view illustrating the plant protector constituting the best practical embodiment of my invention of which I am aware as secured in and above the ground. Fig. 2 is a horizontal section taken in the plane indicated by the line 2—2 of Fig. 1, looking downward. Fig. 3 is a plan view of the cap piece of the protector as said cap piece appears precedent to the bending of the radial arms thereof.

Similar letters designate corresponding parts in all of the views of the drawings, referring to which:

A is the frame of my novel plant protector.

B is the plant-surrounding casing of the protector, and C is the cap piece.

The frame A is preferably made of wire, though it may be made of wood or any other material consonant with the purpose of the invention. It is shown in Figs. 1 and 2, and it will be noted that it comprises a top ring $a$, substantially upright rods $b$, and a base bar $c$ which is fixedly connected to the uprights $b$ at about the distance illustrated above the lower ends thereof and terminates at its ends in hooks $d$, shown by full and dotted lines in Fig. 1. The upright rods $b$ are preferably connected to the top ring $a$ in the manner illustrated in Fig. 1—that is to say by having their upper ends hooked over the said top ring, though it is obvious that the uprights and top ring may be connected in any other manner without affecting my invention.

The casing B is formed of a readily procurable and cheap material, such for instance as pasteboard which is the preferred material. The said casing is formed by bending the piece of pasteboard into circular form and lapping the end portions $a'$ thereof and connecting the said end portions by a paper fastener $e$, or other suitable means; and it is provided, by preference, with an opening $f$, and is also provided at opposite sides of the lower end of the said opening with recesses or rabbets $g$, these latter to enable the hooks $d$ of the frame bar $c$ to hold and at the same time support the casing.

As will be understood by reference to Figs. 1 and 3, the cap piece C which is preferably of pasteboard, is in one piece and is provided with a central opening $h$ for the free circulation of air, and with radial arms $i$ which latter are bent downward at the outer side of the casing B and are preferably interposed between the said casing and the top ring $a$ and uprights $b$ of the frame A. Thus it will be manifest that when occasion demands the cap piece C may be quickly and easily lifted from the remainder of the protector, and yet there is no liability of the cap piece being displaced by the wind while the protector is in use.

In the practical use of my novel protector, the same is placed over the plant to be protected and is pressed downward so as to embed the lower portions of the frame uprights $b$ in the ground, and when the device is thus secured in position it will be manifest that it will not only protect a plant against frost and cold rain and snow, but will support the plant and lessen the liability of the same being blown over or beaten to the ground. It will also be manifest that when desirable the cap piece C may be removed from the remainder of the protector, and that the protector as a whole may be readily lifted from the ground and from about the plant.

When during the use of the protector the pasteboard casing B and cap piece C are deteriorated and rendered useless by exposure, the said parts may be quickly and easily removed from the frame and as readily replaced with new corresponding parts.

The casing B is provided with the opening $f$ for the admission of sunlight and air, and when the protector is placed in position about a plant the said opening $f$ is arranged toward the south or else is arranged at the opposite side of the protector, with reference to the quarter from which the wind is blowing.

It will be gathered from the foregoing that my novel device is adapted to afford adequate protection to growing plants, and is adapted to be quickly and easily placed in position and as readily removed when occasion demands; also, that the protector is exceedingly cheap, and consequently a large number may be produced with but little outlay.

Having described my invention, what I claim and desire to secure by Letters-Patent, is:

1. A plant protector comprising a frame having a top ring, a base bar terminating in hooks, and uprights extending between and connected to the top ring and base bar and also extending below said base bar, a casing arranged within the frame and formed of a piece of material having lapped and connected ends and also having recessed portions held in and supported by the hooks of the said base bar, and a cap piece arranged on the casing and having depending arms interposed between the outer side of the casing and the upper portion of the frame.

2. A plant protector comprising a frame adapted to be embedded in the ground, a casing for surrounding a plant, arranged in and supported by the said frame and open at its upper end, and a top piece removably arranged on the casing and having depending arms interposed and held between the casing and the upper portion of the frame.

3. A plant protector comprising a frame having a top ring, a base bar terminating in hooks, and uprights extending between and connected to the top ring and base bar and also extending below said base bar, a casing arranged within the frame and formed by bending a piece of material into circular form in cross-section and having lapped and connected end portions and also having an opening below said end portions and extending to its lower end and further having recesses in its lower end and at opposite sides of said opening, whereby it is held and supported by the hooks of the frame bar, and an apertured cap piece removably arranged on the casing and having depending arms interposed between the casing and the top ring and uprights of the frame.

In testimony whereof I have hereunto set my hand in presence of two subscribing witnesses.

JOHN A. BYRNE.

Witnesses:
 W. F. BUIL,
 J. D. CALLAHAN.